(12) United States Patent
Treder et al.

(10) Patent No.: US 12,475,671 B2
(45) Date of Patent: Nov. 18, 2025

(54) PROCESSING IMAGE DATA

(71) Applicant: Sony Interactive Entertainment Europe Limited, London (GB)

(72) Inventors: Matthias Treder, London (GB); Aaron Chadha, London (GB); Ilya Fadeev, London (GB); Ioannis Andreopoulos, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 482 days.

(21) Appl. No.: 17/542,239

(22) Filed: Dec. 3, 2021

(65) Prior Publication Data

US 2023/0112647 A1  Apr. 13, 2023

(30) Foreign Application Priority Data

Oct. 7, 2021 (GR) .............................. 20210100684

(51) Int. Cl.
*G06V 10/25* (2022.01)
*G06N 3/045* (2023.01)
(Continued)

(52) U.S. Cl.
CPC ............. *G06V 10/25* (2022.01); *G06N 3/045* (2023.01); *G06N 3/084* (2013.01); *G06V 10/751* (2022.01); *G06V 10/82* (2022.01)

(58) Field of Classification Search
CPC ...... G06V 10/25; G06V 10/751; G06V 10/82; G06N 3/045; G06N 3/084; G06N 3/0455;
(Continued)

(56) References Cited

U.S. PATENT DOCUMENTS

| | | | |
|---|---|---|---|
| 6,188,381 B1 * | 2/2001 | van der Wal | ............. G06T 1/20 345/554 |
| 10,984,560 B1 | 4/2021 | Appalaraju et al. | |

(Continued)

FOREIGN PATENT DOCUMENTS

| | | |
|---|---|---|
| CN | 119442896 A | 2/2025 |
| WO | WO 2023031503 A1 | 3/2023 |

OTHER PUBLICATIONS

European Search Report for European Patent Application No. 21207436.3, dated May 11, 2022, 12 pages.

(Continued)

*Primary Examiner* — Andrew W Bee
*Assistant Examiner* — D J Dhooge
(74) *Attorney, Agent, or Firm* — Fish & Richardson P.C.

(57) ABSTRACT

A method of processing image data is provided. Pixel data for a first image is preprocessed to identify a subset of the pixel data corresponding to a region of interest depicting a scene element. The subset of the pixel data is processed at a first encoder to generate a first data structure representative of the region of interest, the first data structure identifying the scene element depicted in the region of interest. The subset of pixel data is also processed at a second encoder to generate a second data structure representative of the region of interest, the second data structure comprising values for visual characteristics associated with the scene element. The first and second data structures are outputted for use by a decoder to generate a second image approximating the region of interest of the first image.

19 Claims, 8 Drawing Sheets

(51) Int. Cl.
*G06N 3/084* (2023.01)
*G06V 10/75* (2022.01)
*G06V 10/82* (2022.01)

(58) Field of Classification Search
CPC .. G06N 3/0464; G06N 3/0475; H04N 19/117; H04N 19/17; H04N 19/20; H04N 19/167
See application file for complete search history.

(56) References Cited

U.S. PATENT DOCUMENTS

| | | | |
|---|---|---|---|
| 2006/0167670 | A1 | 7/2006 | Deering |
| 2016/0267666 | A1* | 9/2016 | Kim ............... H04N 13/207 |
| 2020/0242774 | A1* | 7/2020 | Park ............... G06T 7/11 |
| 2020/0250436 | A1* | 8/2020 | Lee ............... G06V 10/82 |
| 2020/0351484 | A1* | 11/2020 | Aflaki ............... G06T 7/41 |
| 2021/0006755 | A1* | 1/2021 | Kim ............... G06T 3/4046 |
| 2021/0042503 | A1 | 2/2021 | Karras et al. |
| 2021/0174395 | A1* | 6/2021 | Khan ............... G06F 16/29 |
| 2023/0145616 | A1 | 5/2023 | Chadha et al. |
| 2023/0260301 | A1 | 8/2023 | Hassani et al. |

OTHER PUBLICATIONS

Zhang et al., "Unsupervised Discovery of Object Landmarks as Structural Representations", arxiv.org, Cornell University Library, 201 Olin Library Cornell University Ithaca, NY 14853, Apr. 12, 2018 (Apr. 12, 2018), XP080870132.
Feng et al., "A Generative Compression Framework for Low Bandwidth Video Conference", 2021 IEEE International Conference on Multimedia & Expo Workshops (ICMEW), Jul. 5, 2021 (Jul. 5, 2021), pp. 1-6, XP055916261, DOI: 10.1109/ICMEW53276. 2021.9455985 ISBN: 978-1-6654-4989-2.
Zhan et al., "Pose-Normalized and Appearance-Preserved Streetto-Shop Clothing Image Generation and Feature Learning", IEEE Transactions on Multimedia, IEEE, USA, vol. 23, Mar. 5, 2020 (Mar. 5, 2020), pp. 133-144, XP011826574, ISSN: 1520-9210, DOI: 10.1109/TMM.2020.2978669 [retrieved on Dec. 16, 2020].
Ak et al., "Towards Perceptually Plausible Training of Image Restoration Neural Networks," Paper, 2019 Ninth International Conference on Image Processing Theory, Tools and Applications (IPTA), IEEE, Nov. 6, 2019, 5 pages.
Ballé, "Density modeling of images using a generalized normalization transformation," CoRR, Submitted on Feb. 29, 2016, arXiv:1511. 06281v4, 14 pages.
Bourtsoulatze et al. "Deep Video Precoding," CoRR, Submitted on Dec. 13, 2019, arXiv:1908.00812, 16 pages.
Carandini et al. "Normalization as a canonical neural computation," Nature Reviews Neuroscience, 2012, 13:51-62 (abstract only).
Cohen et al., "Steerable CNNs," CoRR, submitted on Dec. 27, 2016, ArXiv:1612.05498v1, Dec. 27, 2016, 14 pages.
developer.nvidia.com [online], "NVIDIA cuDNN," available on or before Mar. 22, 2016, via Internet Archive: Wayback Machine URL<https://web.archive.org/web/20160322074424/https://developer.nvidia.com/cudnn>, retrieved on Jul. 3, 2025, retrieved from URL<https://developer.nvidia.com/cudnn>, 7 pages.
Dziedzic et al., "Band-limited Training and Inference for Convolutional Neural Networks," CoRR, Submitted on Nov. 21, 2019, arXiv:1911.09287v1, 16 pages.
Goodfellow et al., "Generative Adversarial Nets," CoRR, Submitted on Jun. 10, 2024, arxiv:1406.2661v1, 9 pages.
Hepburn et al., "PerceptNet: A Human Visual System Inspired Neural Network for Estimating Perceptual Distance," CoRR, Nov. 17, 2020, arXiv:1910.12548v2, 5 pages.
Laparra et al., "Perceptual image quality assessment using a normalized Laplacian pyramid," Paper, Proc. IS&T International Symposium on Electronic Imaging: Conf. on Human Vision and Electronic Imaging, Feb. 14-18, 2016, 28:1-6.
Li et al. "Image quality assessment by separately evaluating detail losses and additive impairments," IEEE Transactions on Multimedia, Oct. 2011, 13(5):935-949.
Lubin et al., "A visual discrimination model for imaging system design and evaluation," Vision Models for Target Detection and Recognition: In Memory of Arthur Menendez, 1995, 245-283 (abstract only).
netflixtechblog.com [online], "VMAF: The Journey Continues," Oct. 25, 2018, retrieved on Jan. 5, 2022, retrieved on URL<https://nelflixtechblog.com/vmaf-the-journey-conlinues-44b51ee9ed12>, 12 pages.
Sheikh et al., "A visual information fidelity approach to video quality assessment," The First International Workshop on Video Processing and Quality Metrics for Consumer Electronics, Jan. 23, 2005, 7(2):2117-2128.
Simoncelli et al., "The steerable pyramid: A flexible architecture for multi-scale derivative computation," Paper, Proceedings, International Conference on Image Processing, Washington, DC., Oct. 1995, 7 pages.
Wang et al. "Image quality assessment: from error visibility to structural similarity," IEEE Transactions on Image Processing, Apr. 2004, 13(4):1-14.
Watson et al., "DCTune perceptual optimization of compressed dental X-Rays," Medical Imaging 1997: Image Display, International Society for Optics and Photonics, May 7, 1997, 3031:358-371.
Yu et al., "Towards the Next Generation of Retinal Neuroprosthesis: Visual Computation with Spikes," CoRR, Submitted on Jan. 13, 2020, arXiv:2001.04064v1, 15 pages.

* cited by examiner

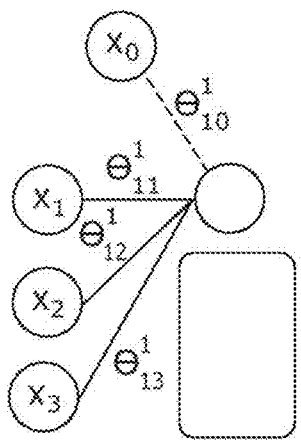

$g(\Theta_{10}^1 x_0 + \Theta_{11}^1 x_1 + \Theta_{12}^1 x_2 + \Theta_{13}^1 x_3)$ $\Theta_{13}^1$ means:

1 (superscript) - mapping from layer 1
1 - mapping to node 1 in layer 2 (L+1)
3 - mapping from node 3 in layer 1 (L)

Fig. 2(a)

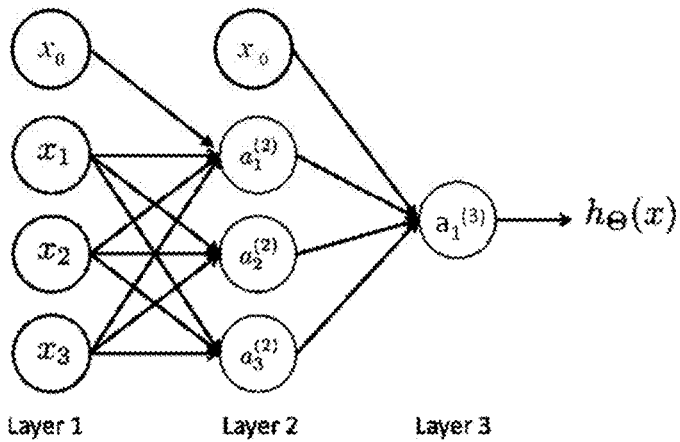

$a_1^{(2)} = g(\Theta_{10}^{(1)} x_0 + \Theta_{11}^{(1)} x_1 + \Theta_{12}^{(1)} x_2 + \Theta_{13}^{(1)} x_3)$
$a_2^{(2)} = g(\Theta_{20}^{(1)} x_0 + \Theta_{21}^{(1)} x_1 + \Theta_{22}^{(1)} x_2 + \Theta_{23}^{(1)} x_3)$
$a_3^{(2)} = g(\Theta_{30}^{(1)} x_0 + \Theta_{31}^{(1)} x_1 + \Theta_{32}^{(1)} x_2 + \Theta_{33}^{(1)} x_3)$
$h_\Theta(x) = a_1^{(3)} = g(\Theta_{10}^{(2)} a_0^{(2)} + \Theta_{11}^{(2)} a_1^{(2)} + \Theta_{12}^{(2)} a_2^{(2)} + \Theta_{13}^{(2)} a_3^{(2)})$

Fig. 2(b)

PROCESSING IMAGE DATA

CROSS-REFERENCE TO RELATED APPLICATIONS

This application claims priority to Greek Application No. 20210100684, filed Oct. 7, 2021, the entire contents of which are incorporated herein by reference.

INTRODUCTION

Technical Field

The present disclosure concerns computer-implemented methods of processing image data. The disclosure is particularly, but not exclusively, applicable where the image data is video data.

BACKGROUND

In many applications, image or video data may be captured, e.g. at a first location, and subsequently reproduced, e.g. at a second location, following encoding and decoding of the image or video data. Such applications include conversational services, for example. It is known in this field to produce video representations which render faces for conversational services, e.g. so-called 'talking heads' video of two people talking to each other in a video conferencing scenario. Such renderings may be photorealistic, e.g. visually-acceptable approximations of original images. In other cases, such renderings are exact (e.g. lossless) visual reproductions of original images. In still further cases, such renderings are not reproducing an original image or video at all, but are based on animating a model using pre-existing or hard-coded movement variations, for example.

Where image or video data is to be stored on a storage device and/or transmitted over a network, it may be desirable to compress the original image or video data into a more compact representation which, however, can still be used to reproduce the original image (or an acceptable approximation thereof). That is, it is desirable to reduce the amount of data that is transferred, stored, processed or otherwise used.

Some known methods in the field of conversational services encode head pose parameters using canonical 2D landmarks (descriptors for head tilt, eyes, lips etc.) and use this more compact representation to reproduce a video sequence of the head model in head poses corresponding to these parameters. Such a compact representation uses less data than pixel data (e.g. of an originally captured image or video). Alternatively, morphable 3D head models have been used to additionally represent depth information. Other methods involve using linear or quasi-linear methods (e.g. principal components or similar) or nonlinear variants thereof (e.g. kernel principal components) in order to decompose the area of video conference frames corresponding to the human face(s) of the speaker(s) in terms of domain-specific basis vectors or frames and use this compact set of components to render a reconstruction of the speaker(s) into video at the receiver side. However, such methods rely on pre-existing knowledge of the speaker's identity (to allow a model to be constructed), and are specific (i.e. in a fixed, hand-crafted or hard-coded manner) to characteristics and gestures related to faces and heads. Such methods therefore have limited applicability beyond the specific domain of 'talking heads'. Such methods may also be relatively inflexible and/or require substantial effort to change or optimize further.

The emergence of deep video compression and generative adversarial networks (GANs) has led to proposals for compact image/video representations using downscaling and upscaling of the input video. However, in such methods the entirety of the input signal may be required to be represented in order to reproduce the original image/video, and this may be inefficient in many cases.

The present disclosure seeks to solve or mitigate some or all of these above-mentioned problems. Alternatively and/or additionally, aspects of the present disclosure seek to provide improved methods of processing image data.

SUMMARY

In accordance with a first aspect of the present disclosure there is provided a computer-implemented method of processing image data, the method comprising: receiving pixel data for a first image; preprocessing the received pixel data to identify a subset of the pixel data corresponding to a region of interest of the first image depicting at least one scene element; first processing the subset of the pixel data at a first encoder to generate a first data structure representative of the region of interest, the first data structure comprising a scene identifier identifying the at least one scene element depicted in the region of interest, wherein the scene identifier is invariant to changes in the configuration of the at least one scene element between different images depicting the at least one scene element; second processing the subset of the pixel data at a second encoder to generate a second data structure representative of the region of interest, the second data structure comprising values for one or more visual characteristics associated with the at least one scene element depicted in the region of interest; and outputting the first data structure and the second data structure for use by a decoder to generate a second image approximating the region of interest.

In embodiments, a scene element, i.e. an element of the scene depicted in the first image, may be an object. In other embodiments it may be a collection of objects, or may be another semantically consistent region, which may or may not be amorphous, for example the sky depicted in an image, parts of the background or foreground texture of an image, or the like.

The first encoder may be referred to as a 'scene identity' encoder, because it is configured to assign a different identifier to each unique element of a scene. As such, the first encoder provides an indicator of the identity of a particular element depicted in the region of interest.

The second encoder may be referred to as a 'structure extraction' encoder, because it is configured to extract structural details (e.g. visual characteristics) from the pixel data that are not captured by the first encoder. Taken together, the first and second data structures provide sufficient information for an accurate (e.g. photorealistic) rendering of the structural aspects of the original image content.

The processing of the subset of the pixel data by the first encoder may be followed by the processing by the second encoder. However, it will be appreciated that in embodiments, the processing by first encoder and second encoder may be entirely independent. In embodiments, either the first encoder or the second encoder may process the pixel data first, or in embodiments both may process the pixel data in parallel.

By processing the pixel data using the first and second encoders, compact representations of the region of interest of the first image can be produced (namely the first and second data structures), which can then be used to generate an image approximating the region of interest, e.g. photorealistically. The first and second data structures may be significantly smaller, in terms of the amount of data used, stored and/or transferred, than the pixel data for the first image. For example, where the method is applied to a streaming video application (where each frame of the video is processed in the above-described manner), outputting the first and second data structures may correspond to a few kilobits-per-second, which is far less than the amount of data required to transmit and/or store the pixel data for the video itself. The first and second data structures may therefore be referred to as 'compact representations' of the content of the region of interest, in comparison to the subset of the pixel data which also represents the region of interest.

An example application domain for the methods described herein is video conferencing, where the second image corresponds to a photorealistic representation (e.g. an avatar) of a speaker depicted in the region of interest of the first image. Other application domains for the methods described herein include, but are not limited to, surveillance monitoring, monitoring of industrial processes, internet-of-things monitoring, video gaming, conversational services, video communications, video streaming, video monitoring in autonomous vehicle, and traffic monitoring.

Unlike known methods that use specific semantics for a given domain, for example facial landmarks to represent faces of speakers in video conferencing, or specific and predetermined edge and texture information as used by other techniques, the methods described herein use a structure extraction encoder and a scene identity encoder to automatically derive the appropriate structural features (e.g. visual characteristics) to use. This is achieved in a learnable (e.g. supervised or unsupervised) manner, without being driven by application-specific semantics such as predetermined facial landmarks or edge maps. This means that, for a video conferencing application for example, compact features corresponding to facial expressions (e.g. laughing, frowning, mouth or eyebrow movements) will be derived automatically, rather than merely using predetermined face landmark points or edge maps, or face-specific mesh structures. Additionally, features corresponding to posture of the shoulders, arms/hands/hair movements, etc. can be derived. Similarly, for an internet-of-things monitoring application, the encoders can automatically derive features corresponding to the movement of specific scene elements of interest, e.g., the movement of drones on the sky and their structure, or changes of traffic patterns in one or more traffic lanes of a motorway.

The methods described herein provide compact representations for domain-specific video. Unlike known methods related to conversational video representations, the methods described herein are not specific to head poses, facial appearance characteristics or facial gestures. Instead, the methods and systems described herein can be readily adapted and applied across a wide range of different application domains, resulting in a more flexible and versatile solution. The methods and systems described herein can still be tailored to the domain of conversational video, as one example, but can also be tailored to other domains as desired (e.g. by training the various encoders and components using representative training data, as described in more detail below).

Further, in comparison to known deep video compression and generative adversarial networks (GANs), a representation of the entirety of the input image is not required in the methods described herein. Instead, a scene identity encoder that outputs a compact identifier representing the generic visual characteristics of a region of interest in comparison to other regions of other images is used, to provide a more compact representation of the image content.

In embodiments, the second image is a photorealistic rendering of at least one scene element depicted in the region of interest of the first image. In embodiments, the second image resembles the region of interest of the first image, but is not an exact reconstruction of the region of interest of the first image. As such, the second image may appear visually different than the region of interest of the first image, but is nevertheless an approximation of the region of interest of the first image. For example, the disclosed system, in some embodiments, does not produce a faithful visual replication of the first image, but rather produces an image that has structural components that are similar to the first image, but the exact appearance of the structural components will be based on training data. If the training data resembles the visual appearance of the first image, then faithful visual reproduction of the first image at the image generator is possible.

The at least one scene element depicted in the region of interest may comprise a single scene element (e.g. a car) or, in some cases, a plurality of scene elements which together form a scene element to be identified by the scene element identifier (e.g. various facial features of a particular individual, or a mixture of background textures). As mentioned above, the scene element identifier is invariant to changes in the configuration of the input image. That is, its corresponding scene element may have different orientations, positions, appearances, and/or may be depicted in different lighting, with different backgrounds, etc., in different images. Regardless of the particular configuration and/or visual characteristics associated with a scene element in a given image, the same scene identifier is assigned to the scene element. This may be achieved, for example, by training the first encoder using multiple images of a given scene element or scene element under different configurations and/or visual characteristics. As such, the scene element identifier is both unique to the scene element itself and invariant to the configuration of the scene element in the image.

In embodiments, the second encoder is configured to determine the one or more visual characteristics whose values are to be included in the second data structure. Such a determination may be based on the identity of the scene element, e.g. as determined by the first encoder. As such, the one or more visual characteristics may be specific to the scene elements(s) and/or scene depicted in the region of interest. For example, where the scene element is a car, the one or more visual characteristics may include a location in the image of the wheels and/or trunk of the car, a license plate number of the car, etc. Where the scene element is or relates to a human face, in contrast (and optionally the face of a particular individual), the one or more visual characteristics may include the location and/or movement of facial features such as eyebrows and mouth, hand movements, posture, etc. Therefore, the second encoder may be configured to extract only details from the pixel data that are relevant to the scene element(s) in question (and not details that are not relevant), and to include such details in the second data structure. In embodiments, the first encoder is configured to determine the one or more visual characteristics.

In embodiments, the second encoder is configured to determine the one or more visual characteristics by identifying features of the region of interest which are visually salient. Such visually salient features may be specific to (and dependent on) the scene element(s) and/or scene depicted in the region of interest of the first image. In embodiments, the one or more visual characteristics do not comprise or relate to features of the region of interest which are determined not to be visually salient. Encoding only the visually salient (e.g. noticeable) characteristics of the region of interest facilitates an accurate reproduction (or approximation) of the region of interest, whilst reducing the amount of data used to represent the content of the region of interest.

In embodiments, the first encoder comprises an artificial neural network, for example a convolutional neural network (CNN). The second encoder may also comprise such an artificial neural network, as discussed further below. Advantageously, such a neural network comprises multiple layers having a convolutional architecture, with each layer being configured to receive the output of one or more previous layers. Such an artificial neural network may comprise a set of interconnected adjustable weights and activation functions. In embodiments, the outputs of each layer of the neural network are passed through a non-linear parametric linear rectifier function, pReLU. Other non-linear functions may be used in other embodiments.

In embodiments, the first encoder is configured to distinguish between the at least one scene element that is depicted in the region of interest and at least one second scene element, the at least one scene element and the at least one second scene element being of a common scene element type. For example, where the scene element type is 'car', the first encoder may be configured to distinguish between cars of different models. Where the scene element type is 'face', the first encoder may be configured to distinguish between the faces of different individuals. As such, a scene element (e.g. at least one scene element depicted in a scene) is mapped by the first encoder onto a latent representation embodied by a low-dimensional vector representing the content of the region of interest. This mapping is invariant to changes in irrelevant features of the input, such as viewpoint, background changes, lighting, etc. At the same time, such a mapping is class-unique. That is, two different scene elements map onto two different latent representations (e.g. identifiers) unless both elements are representing near-identical scene elements (e.g. two photographs of the same person but with different clothes or glasses).

In embodiments, the first encoder is configured to use a differentiable loss function, for example a triplet loss function. This enables the first encoder to learn how to map scene elements to identifiers so as to simultaneously enable invariance (to viewpoint and other details) and identity, as described in more detail below.

In embodiments, the scene element identifier is indicative of generic structural characteristics of the content of the region of interest in comparison to other regions of the image and/or of other images. Such generic structural characteristics are sufficient to identify what is depicted in the region of interest, e.g. the at least one scene element, but do not describe how such scene elements are depicted, e.g. the configuration of the at least one scene element. This is in contrast with the values of the one or more visual characteristics comprised in the second data structure, which may be indicative of more specific (or fine-grained) characteristics of the content of the region of interest, and which describe how the scene elements are depicted in the region of interest.

In embodiments, the second encoder comprises an artificial neural network, e.g. a convolutional neural network, configured to output a vector comprising the values of the one or more visual characteristics. In embodiments, the second encoder is configured to determine visual details of the region of interest to which the subset of pixel data corresponds that are not captured by the first processing at the first encoder. As such, the second data structure produced by the second encoder complements the first data structure produced by the first encoder. In isolation, neither data structure alone may be sufficient to generate an adequate rendering of the region of interest at the decoder, but taken in combination the first and second data structures provide enough information to the decoder (in a compact format) to allow the decoder to generate an acceptable approximation of the region of interest of the first image. The first and second encoders may be trained separately or simultaneously.

In embodiments, the second encoder is configured to locate one or more landmarks in the region of interest to which the subset of pixel data corresponds. The one or more visual characteristics comprise co-ordinates of the one or more landmarks in the region of interest. The landmarks used may depend on the scene element(s) and/or scene depicted. That is, different landmarks may be used for different scene elements and/or scene element types. In embodiments, the landmarks have semantic significance to the scene element(s) depicted. The landmarks enable the decoder to generate a second image in which the scene elements are depicted with a position, orientation, perspective and/or movement that is similar to how the scene elements are depicted in the first image. The landmarks may be pre-defined (and the second encoder trained to locate such pre-defined landmarks), or may be determined by the system (e.g. in an unsupervised manner).

In embodiments, the one or more visual characteristics relate to one or more of: lighting, orientation, movement, and perspective in the region of interest. This enables the decoder to generate a second image in which the scene elements are depicted in a manner (i.e. with an appearance and/or configuration) that is similar to how the scene elements are depicted in the first image, thereby improving the accuracy of the second image in approximating the region of interest of the first image. In particular, this may enable the second image to visually resemble the region of interest of the first image.

In embodiments, the first and second data structures, produced by the first and second encoders, respectively, are combined and optionally compressed (e.g. principal components analysis) for subsequent storage and/or transmission as a bitstream. The first and second data structures may also be quantized to a fixed number of bits for packaging and transport.

In embodiments, the second image is generated at an image generator module using the scene element identifier and the values of the one or more visual characteristics. The image generator module may be comprised in a decoder device, for example. In some cases, the image generator module is co-located with the first and second encoders (e.g. for training purposes). In embodiments, the image generator module comprises an artificial neural network trained to generate images using the outputs of the first and second encoders. The image generator module may be trained offline based on offline training outputs of the first and second encoders, and adjusted such that images are generated which visually resemble the training input images.

In embodiments, the first encoder and/or the second encoder (which may each comprise an artificial neural network) are trained using back-propagation of errors based on a comparison between the region of interest of the first image and the second image generated by the image generator module. For example, the weights and/or activation functions of the first encoder and/or second encoder can be adjusted to minimize one or loss functions relating to the generated second image. This enables the first encoder and/or the second encoder to produce data structures which facilitate more accurate image generation by the image generator module.

In embodiments, back-propagation learning uses learning rules that are deterministic or stochastic (e.g. done after averaging over batches of arbitrarily sampled inputs/outputs). Gradients can be computed on single inputs, on batches of inputs or on the whole training dataset, per training iteration. The learning parameters, such as the initial learning rate and learning rate decay, can be empirically tuned to optimize speed of training and performance. Batches of training data can be selected in a deterministic or random/pseudo-random manner.

In embodiments, one or more components of the system (e.g. the preprocessing function, the first encoder, the second encoder and/or the image generator module) are differentiable. This allows the overall system to be trained end-to-end using back-propagation of errors and stochastic gradient descent. In embodiments, one or more components of the system are not differentiable, but other components of the system are differentiable. In embodiments, one or more components of the system (e.g. the preprocessing function, the first encoder, the second encoder and/or the image generator module) comprise or use differentiable loss functions.

In embodiments, the first encoder and/or the second encoder are trained using a discriminator function configured to determine whether the second image generated by the image generator module is a real image or a synthesized image. The discriminator function is configured to produce a composite set of loss functions that can be minimized using stochastic gradient descent and back-propagation through the first encoder and/or the second encoder. As such, the first encoder and/or the second encoder can be adjusted to enable the image generator module to generate images which are more visually realistic. In embodiments, the discriminator function itself comprises an artificial neural network. The discriminator neural network may be trained to distinguish between real training data and reconstructed training data generated using the first and second encoders, and the classification error of this distinction may be used in the backpropagation-based training process of the first and second encoders.

In embodiments, the set of loss functions are calculated in a latent space of a neural network that takes as inputs the subset of pixel data corresponding to the region of interest of the first image and the second image generated by the image generator module. By using loss functions which represent the reconstruction error in generated images, or the loss of structure from such reconstruction, the first encoder and/or the second encoder can be trained without using labels or annotations.

In embodiments, the first encoder and/or the second encoder are trained using one or more optimizing functions configured to score a loss of fidelity between the region of interest of the first image and the second image generated by the image generator module, based on one or more of mean absolute error, mean squared error, and/or structural similarity index metrics that can be minimized using stochastic gradient descent and back-propagation through the first encoder and/or the second encoder. As such, the first encoder and/or the second encoder can be adjusted to enable the image generator module to generate images which more closely resemble the original images.

In embodiments, the first encoder and/or the second encoder are trained using one or more optimizing functions configured to score a quality of the second image generated by the image generator module. Quality scores that can be used by the disclosed methods and system include, but are not limited to, one or more of the following objective, perceptual or aesthetic image quality scores: peak-signal-to-noise ratio (PSNR), structural similarity index metric (SSIM), multiscale quality metrics such as the detail loss metric or multiscale SSIM, metrics based on multiple quality scores and data-driven learning and training, such as the video multi-method assessment fusion (VMAF), or aesthetic quality metrics, and variations of these metrics. The quality scores can be reference or non-reference based, with each quality score being maximized via back-propagation and gradient-descent methods and training input data that is used to produce the quality score.

In embodiments, the second image comprises a photorealistic rendering of the region of interest to which the subset of the pixel data corresponds. The photorealistic rendering depicts the at least one scene element identified by the scene element identifier (comprised in the first data structure) in accordance with the values of the one or more visual characteristics (comprised in the second data structure). As such, the second image may be a visually acceptable (or in some cases visually imperceptible) approximation of the region of interest of the first image.

In embodiments, the preprocessing is performed by a preprocessing module comprising an artificial neural network, e.g. a CNN, trained to identify regions of interest in images. Such a CNN may output a preprocessed image alongside with bounding box coordinates or segmentation maps, or a single masked preprocessed image, for example, indicating the size and/or position of the identified region of interest. Such a preprocessed image may comprise only the subset of pixel data corresponding to the region of interest, or may comprise the entirety of the pixel data for the first image, but indicating the region corresponding to the subset of pixel data. The preprocessing CNN may be fully learnable and its weights may be adjusted via gradient descent based on loss functions further downstream (e.g. based on the generated second image). In embodiments, the preprocessing module includes a segmentation model, which may itself comprise a CNN.

The methods of processing image data described herein may be performed on a batch of video data, e.g. a complete video file for a movie or the like, or on a stream of video data. In embodiments, the received pixel data represents a portion of an image or video frame, e.g. a block or sub-region of an image.

In embodiments, the method further comprises: determining one or more loss functions based on the generated second image; and adjusting the first encoder, second encoder, preprocessing function and/or image generator function using back-propagation of the value of the one or more loss functions. The one or more loss functions may relate to visual quality and/or fidelity associated with the output, for example. Adjusting the various encoders and functions (which may each comprise a respective neural network) may comprise adjusting the weights and/or activation functions of the neural networks, thereby optimizing the performance of the neural networks. As such, training of the neural networks may be performed not only during an initial training phase, but may be repeated online during deployment, in order to adjust to specific content or domains, or fine-tune the already established weights and/or activation functions.

In accordance with a second aspect of the present disclosure, there is provided a computer-implemented method of generating an image at a decoder, the method comprising: receiving a first data structure representative of a region of interest of a first image, the first data structure comprising a scene element identifier identifying at least one scene element depicted in the region of interest, wherein the scene element identifier is invariant to changes in the configuration of the at least one scene element between different images depicting the at least one scene element; receiving a second data structure representative of the region of interest, the second data structure comprising values for one or more visual characteristics associated with the at least one scene element depicted in the region of interest; and generating for display, using the first data structure and the second data structure, a second image approximating the region of interest of the first image.

In embodiments, the second image comprises a photorealistic rendering of the at least one scene element depicted in the region of interest of the first image.

In embodiments, the second image is generated by the decoder in the absence of (i.e. without using) the pixel data of the first image. That is, the first data structure and the second data structure do not comprise pixel data, and the second image is generated using the first and second data structures rather than using pixel data. In embodiments, the first and second data structures comprise less data (and are therefore more compact) than pixel data representing the region of interest of the first image.

In accordance with another aspect of the disclosure there is provided a computing device comprising: a processor; and memory, wherein the computing device is arranged to perform using the processor any of the methods described above.

In accordance with another aspect of the disclosure there is provided a computer program product arranged, when executed on a computing device comprising a processor or memory, to perform any of the methods described above.

It will of course be appreciated that features described in relation to one aspect of the present disclosure described above may be incorporated into other aspects of the present disclosure.

DESCRIPTION OF THE DRAWINGS

Embodiments of the present disclosure will now be described by way of example only with reference to the accompanying schematic drawings of which:

FIGS. 2(a) to 2(c) are schematic diagrams showing a neural network in accordance with embodiments;

DETAILED DESCRIPTION

Embodiments of the present disclosure are now described.

Figure 1:
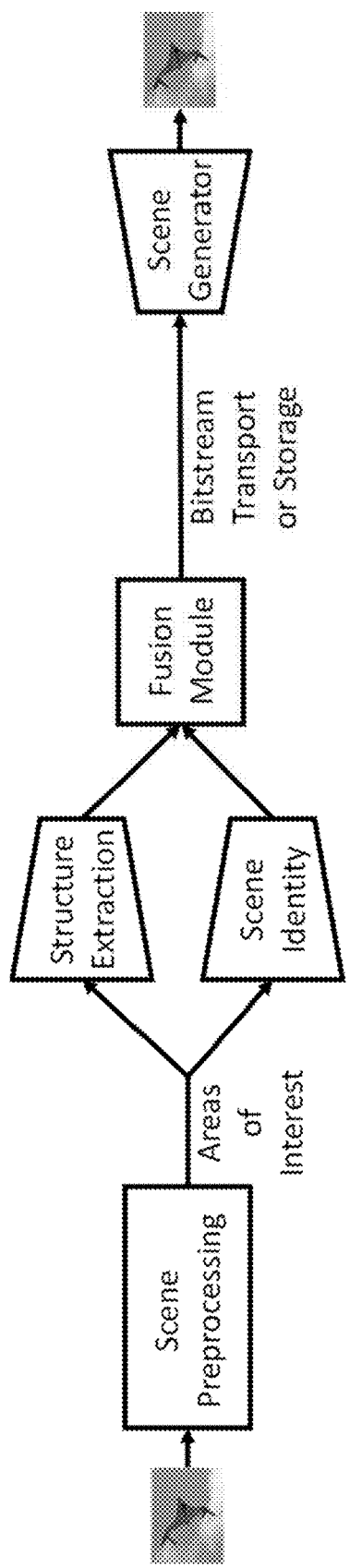
FIG. 1 is a schematic workflow diagram showing an example of image processing in accordance with embodiments.

FIG. 1 is a schematic diagram showing an example of image processing, according to embodiments. In particular, FIG. 1 shows schematically an overview of the components and/or functions that will be described in more detail below.

At an encoder, pixel data of an image is received at a preprocessing module, which is configured to identify a subset of the pixel data corresponding to a region of interest. The subset of pixel of data is then passed to two encoders: a structure extraction encoder and a scene identity encoder. Each of the encoders produces a compact data structure representative of content of the region of interest. A fusion module combines and optionally quantizes and compresses the two data structures, for subsequent storage and/or transmission as a bitstream. In alternative embodiments, the system does not include the fusion module. In some alternative embodiments, the system does not include the preprocessing module.

At a decoder, a scene generator function (also referred to as an 'image generator') receives the first and second data structures (or a combination thereof, optionally in a compressed format), and uses the data structures to generate an image approximating the region of interest of the original image.

As such, the described methods and systems produce compact representations that can be used to render photorealistic image scene representations for specific domains of interest.

As will be discussed in more detail below, each of the encoders, the image generator and the preprocessing function may comprise a respective convolutional neural network that is trained to perform the described function.

The image processing system shown in FIG. 1 may comprise more, fewer and/or different components in alternative embodiments. In embodiments, the system is end-to-end differentiable and can be trained with all of the components in place or in the absence of one or more components.

The embodiments depicted are applicable to batch processing, i.e. processing a group of images or video frames together without delay constraints (e.g. an entire video sequence), as well as to stream processing, i.e. processing only a limited subset of a stream of images or video frames, or even a select subset of a single image, e.g. due to delay or buffering constraints.

Figure 2C:
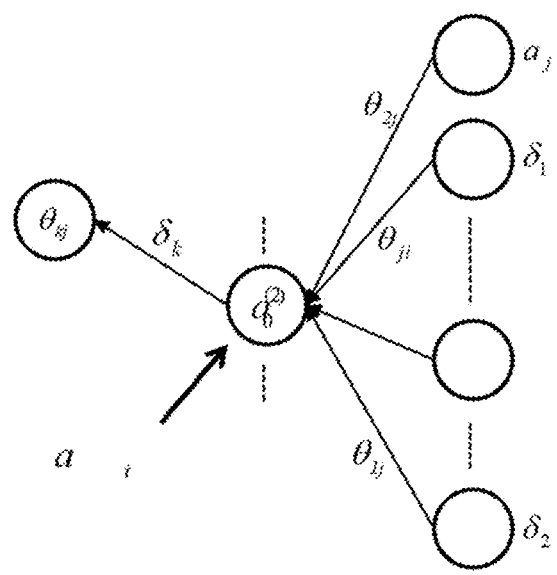
Figure 3:
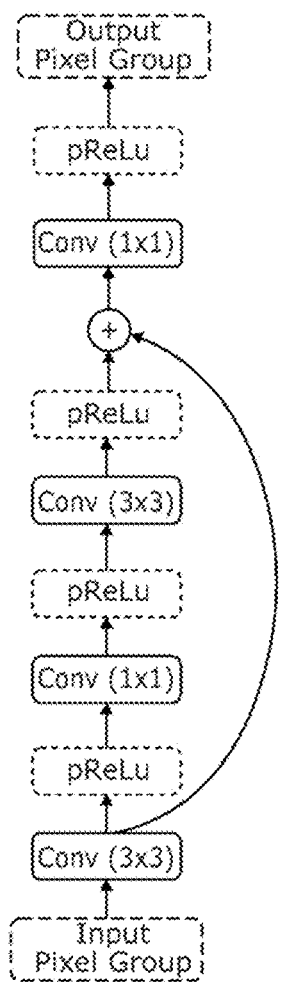
FIG. 3 is a schematic diagram showing a neural network in accordance with embodiments.

The structure extraction and scene identity encoders may each comprise a convolutional neural network (CNN) consisting of a stack of convolutional blocks (as shown in FIG. 3) and stacks of layers of fully-connected neural networks of the type shown in FIG. 2(b). In some embodiments, the convolutional blocks include dilated convolutions, strided convolutions, up/down-scaling operations, and normalization operations. In some embodiments, a given CNN includes a multi-resolution analysis of the image using a U-net architecture. A neural network as described herein can comprise any combination of weights connected in a network and having a non-linear function (akin to an activation function of an artificial neural network). An example of such connections and weights is shown in FIG. 2(a). An example of the global connectivity between weights and inputs is shown in FIG. 2(b). That is, FIG. 2(a) shows a combination of inputs $x_0 \ldots, x_3$ with weight coefficients $\theta$ and non-linear activation function g( ), and FIG. 2(b) is a schematic diagram showing layers of interconnected activations and weights, forming an artificial neural network. Such examples are trained with back-propagation of errors computed at the output layer, using gradient descent methods. This is shown in FIG. 2(c), which depicts schematically the back-propagation of errors δ from coefficient $a_0^{(2)}$ of an intermediate layer to the previous intermediate layer using gradient descent.

An example multi-layer neural network processing pipeline is shown in FIG. 3. In particular, FIG. 3 shows a cascade of convolutional (Cony (k×k)) and parametric ReLu (pReLu) layers of weights and activation functions mapping input pixel groups to transformed output pixel groups. Each layer receives the representation from the previous layer. Convolutional layers extend the example of FIG. 2(b) to multiple dimensions, by performing convolution operations between multi-dimensional filters of fixed kernel size (k×k) with learnable weights and the inputs to the layer. In embodiments, some layers have dilated convolutions or pooling components to increase or decrease the resolution of the receptive field. The connectivity of the cascade of convolutional layers and activation functions can also include skip connections, as shown by the connection from the output of the leftmost "Cony (3×3)" layer of FIG. 3 to the summation point of FIG. 3. In addition, the entirety of the cascade of multiple layers (also known as a deep neural network) is trainable end-to-end based on back-propagation of errors from the output layer backwards (e.g. as shown in FIG. 2(c)), using gradient descent methods.

The output of each CNN can be either a 2D image (or 3D video) or a 1D vector of features. In the latter case the last convolutional layer is vectorized either by reshaping to 1D or alternatively by using a global pooling approach (e.g. global average pooling or global max pooling). The dimensionality of the vector is the number of channels in the last convolutional layer. If the output is 1D, the vectorization may be followed by one or more dense layers (as shown in FIG. 2(b)). The inputs to both CNNs are the outputs of the preprocessing module, which are discussed in more detail below. In short, the inputs comprise either a preprocessed image/video along with bounding box coordinates or segmentation maps, or a single masked preprocessed image/video. In the former case, if the secondary input is bounding boxes, they can be provided as additional inputs to the CNN, e.g., via a series of dense layers or via encoding the bounding boxes as additional input channels, where each input channel has a constant value that corresponds to the value of the bounding box entry. If the secondary input is a segmentation map, this can either be provided as separate input channels concatenated to the preprocessed inputs, or as a separate stream processed by a separate set of convolutional layers.

The purpose of the scene identity encoder (referred to herein as the 'first encoder') is to map a scene element, e.g. a scene element such as a car or a drone or a person's unique structural characteristics, onto a latent representation embodied by a low-dimensional vector or image representation. This mapping is designed to be invariant to changes in the configuration of the scene element between different images, e.g. irrelevant features of the input, such as viewpoint, background changes, lighting, etc. At the same time, this mapping is designed to be class-unique. That is, two different scene elements map onto two different latent representations unless both elements are representing near-identical scene elements (e.g. two cars of the same model or two photographs of the same person but with different clothes and glasses). The scene identity encoder can be equipped with its own differentiable loss function that enables the learning of these properties. An example of a loss function that simultaneously enables invariance (to viewpoint and other details) and identity is triplet loss. Let A be the anchor (current scene element), P (positive) another image of the same scene element e.g. from a different video frame, and N (negative) an image of a different scene element. It is assumed that multiple images or video frames are available for each unique scene element. Let id denote the operator that maps an input onto the latent representation, then the triplet loss is given by:

$$\mathcal{L}_{id} = \max(\|id(A) - id(P)\| - \|id(A) - id(P)\| + \alpha, 0),$$

where α is a hyperparameter that controls the margin between different identity embeddings.

The structure extraction encoder (referred to herein as the 'second encoder') aims to extract scene details that are not captured by the scene identity encoder (e.g. the viewpoint or lighting with which a car is depicted in the image). Taken together, scene identity and structure extraction provide sufficient details for an accurate rendering of the structural aspects of the original image content.

In a first embodiment, the structure extraction encoder (also referred to as a 'landmark detection module') is differentiable, and trainable based on suitable training data. Such data can come in form of additional landmark data represented by a vector L and tagged by human observers. Let $\hat{L}$ be the landmarks predicted by the model, then a simple measure of their discrepancy with the ground truth is the Lp loss:

$$\mathcal{L}_{structure} = \left( \sum_i |L_i - \hat{L}_i|^p \right)^{1/p}$$

with L1 loss (p=1) and L2 loss (p=2) being popular special cases.

In a second embodiment, the structure extraction encoder comprises a pre-trained landmark detector that detects pre-defined landmarks that have semantic significance (e.g. wheels of a car, doors, trunk) and provides their co-ordinates in the image. This detector can be either a pre-existing landmark detection module that can be used as a drop-in component in the model or a trainable (or fine-tunable) landmark detection model. For training, at least one of the scene identity encoder and the structure extraction encoder is differentiable (even if they are not being trained) in order to allow for the end-to-end training of the overall model. If the encoders are both non-differentiable, the model components can only be trained each using their own loss functions.

In a third embodiment, representative video data from a target application domain is available and the structure extraction and scene identity encoders are trained using this data in an unsupervised manner, e.g. without the use of annotations for landmarks or labels being available within the training data. This is achieved by training a first, compact, structure extractor over a large amount of videos from the target application domain, e.g. surveillance videos, or conversational videos, or industrial monitoring videos. This is then used to derive a scene identity encoder that is on one hand specific for the domain, but on the other hand not overly specific to the exact monitoring environment (e.g. exact surveillance scene, or exact speaker, or exact industrial monitoring scene of interest). This can also be coupled with a second, higher-dimensional, structure extractor, e.g. the structure extraction encoder, which is specific to the exact monitoring environment, or conversational speaker of interest, and is trained on specific video content corresponding to such and not on generic application domain content, in contrast with the compact scene extractor.

The combination of the two encoders (scene identity and structure extraction) can produce a domain-specific compact representation of the content of the region of interest, which can optionally be made to be even more specific to the exact monitoring environment of interest, or speaker of interest. In this context of unsupervised learning, a training embodiment of the scene identity encoder comprises an autoencoder that is trained to represent the input large amount of videos with a very compact representation in the latent low-dimensional space of the autoencoder. The higher-dimensional structure extraction encoder is also an autoencoder that is trained in a second stage by considering specific subsets of videos corresponding to specific application contexts, e.g. specific objects, specific scenes, or specific people of interest. These specific subsets of data are used in training iterations to train the higher-dimensional structure extractor and, together, the compact and the higher-dimensional structure extractors achieve two things: (i) the compact structure extractor learns the generic structural characteristics of the domain; (ii) the higher-dimensional structure extractor over fits to the specific scene or object or person of interest and learns the visual representation of that specific item based on the training data. For both autoencoders, no labels or annotations are required to be available in the training data, as the autoencoders are trained by using loss functions that represent the reconstruction error in the training data, or the loss of structure from the autoencoder reconstruction, or by using generative adversarial losses, where a discriminator neural network is concurrently trained to distinguish between real training data and reconstructed training data from the autoencoders and the classification error of this distinction is used in the backpropagation-based training process of the autoencoders. If the amount of training data available is insufficient, data augmentation techniques can be used, whereby additional artificial structures are created by geometric transformations or fusion of multiple inputs together to create new augmented inputs to be used in training. Other regularization techniques, such as spectral renormalization and dropout, may also be selectively applied in order to stabilize the training of the encoders.

In embodiments, the outputs of the structure extraction and/or scene identity encoders are compacted using linear compaction techniques, such as principal components analysis, or non-linear compaction techniques such as kernel principal components or a series of perceptron layers. The compacted outputs are then quantized to a fixed number of bits in order to be packaged and transmitted or stored during inference. Since quantization is non-differentiable, relaxations can be applied during training such as additive uniform noise, or hard quantization can be used in the forward pass only, with soft quantization employed during backpropagation using e.g. a sum of sigmoids fit to the quantizer's step function. For fine-grained control of the size of the compressed data, an entropy loss term can be incorporated into the model that provides a lever for a trade-off between bitrate and the fidelity of the reconstruction.

The image generator function comprises a trained artificial neural network that receives the compacted output of the scene identity and structure extraction encoders, and expands to the final dimensions of the reconstructed image or video. This is achieved with a series of convolutional and upscaling layers, optionally including regularization via spectral normalization. In embodiments, the structure of these layers follows adaptive instance normalization (AdaIN). In other embodiments, the structure of the layers follows the structure shown in FIG. 3, with the inclusion of diluted convolutions and spectral renormalization. The reconstruction losses used as a loss function for the training of the image generator may include the calculation of content loss functions such as VGG. Additionally or alternatively, the reconstruction losses may include other distortion calculations in latent spaces by projecting the output of the image generator into a latent space of a deep neural network, e.g. for structure extraction and scene element detection. In such embodiments, the difference in the last 1-3 layers between the network output when ingesting the input image and when ingesting the reconstructed image from the image generator is calculated.

Figure 4A:
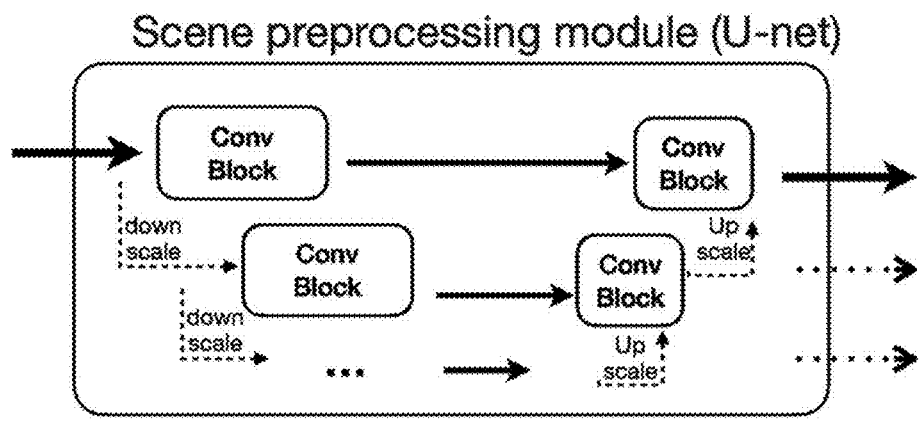
FIGS. 4(a) to 4(e) are schematic diagrams showing examples of image preprocessing in accordance with embodiments.
Figure 4B:
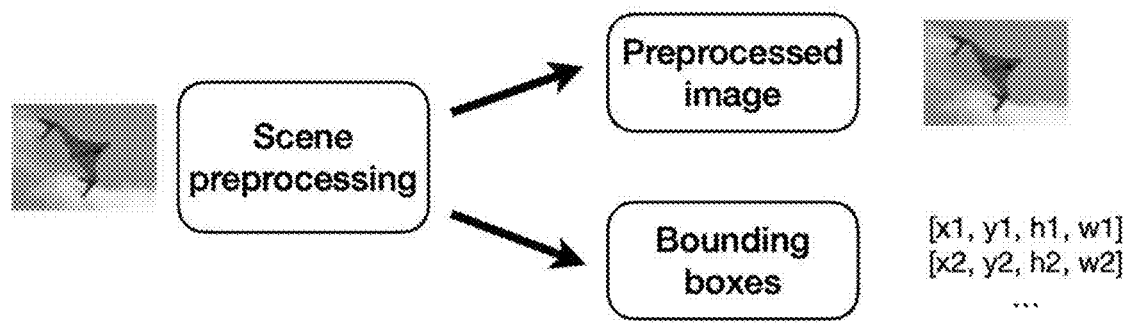

FIGS. 4(a) to 4(e) show schematically examples of the preprocessing function. In embodiments, the preprocessing function comprises a CNN consisting of a stack of convolutional blocks (cony blocks). The convolutional blocks may include dilated convolutions, strided convolutions, up/down-scaling operations, skip connections and normalization operations (e.g. batch norm, instance norm). An example of a cony block is shown in FIG. 3. The preprocessing function can also include a multi-resolution analysis of the image using a U-net architecture. This is shown in FIG. 4(a). Such an architecture involves a series of downscaling operations and analyses using one or more cony blocks in each stage; the lower resolution output is merged with the higher resolution output using a series of upscaling operations. The output is presented at the highest resolution, or multiple outputs are presented at lower resolutions (shown with dotted arrows in FIG. 4(a)). The output of this CNN comprises two components: a preprocessed image and a set of bounding boxes delineating the co-ordinates of scene elements or regions of interest. This is shown in FIG. 4(b). In embodiments, the bounding boxes are vectors of the form [x, y, h, w] where x and y are the image coordinates of the upper left corner of the bounding box and h and w denote the height and width of the box, or any other equivalent representation of the bounding box, e.g. co-ordinates of upper left and lower right corners. In embodiments, the bounding box output can be augmented with additional scalars specifying probabilities for the presence of a particular scene element (e.g. human, animal, inanimate object). In some embodiments, the bounding box output involves a separate computational head that includes one or more densely connected layers (as shown in FIG. 2(b)). The preprocessing function is fully learnable and its weights may be adjusted via gradient descent based on loss functions further downstream.

Figure 4C:
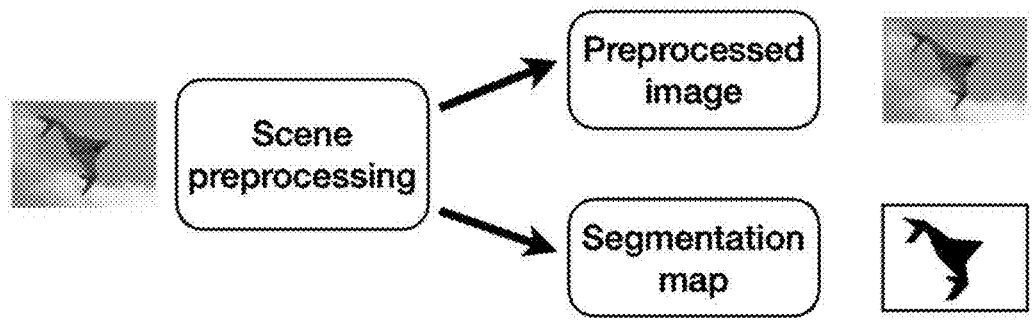

In embodiments, the output of the preprocessing function comprises a segmentation map instead of bounding boxes. This is shown in FIG. 4(c). The segmentation map is obtained via binarization of the activation map using a tanh or sigmoid function, or variations of such non-linear functions. For automated segmentation into multiple semantic categories (e.g. humans, animals, inanimate objects), separate segmentation maps can be used, where each segmentation map is trained to designate a different one of the semantic categories.

Figure 4D:
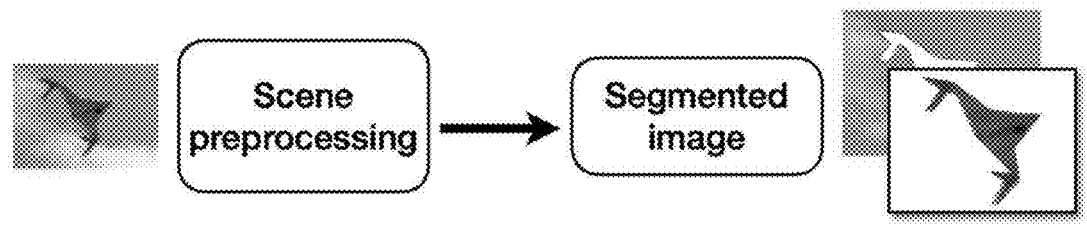

In embodiments, instead of producing a preprocessed image output and a segmentation map, regions of interest are masked out and the CNN produces a single output with multiple output channels. This is shown in FIG. 4(d). Each of the output channels contains a portion of the image referring to a particular scene element or designated region of interest. If the image has been fully segmented into semantic categories, adding these outputs together yields a preprocessed version of the original image.

Figure 4E:
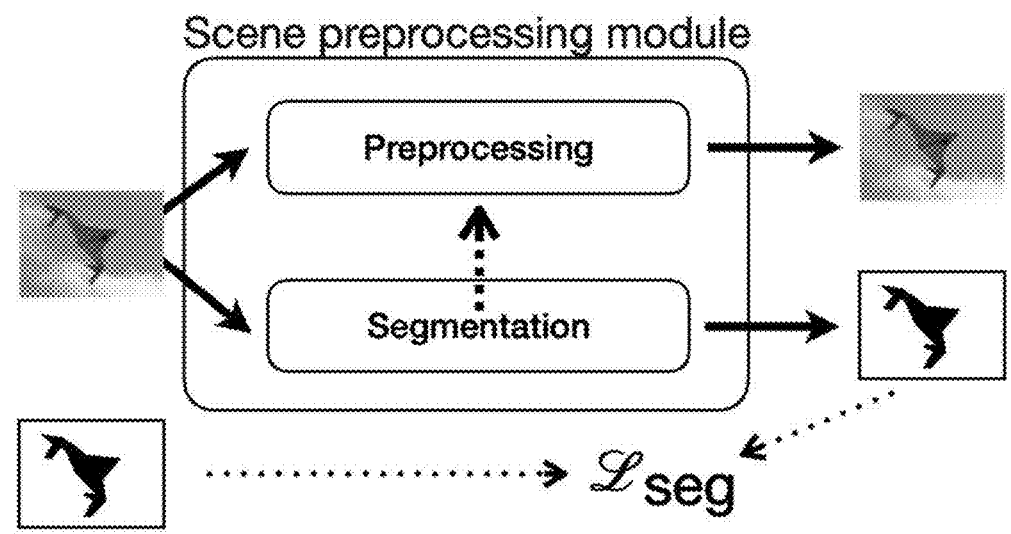

In embodiments, instead of being a single CNN, the preprocessing function is compartmentalized into an analysis CNN (configured to output a preprocessed image) and a separate segmentation model that is configured to output a segmentation map. This is shown in FIG. 4(e). The segmentation model may comprise a trainable CNN or a pretrained segmentation model that is used for fine-tuning. In some embodiments, the segmentation model is a non-trainable segmentation model that is used as a drop-in component of the image processing system. The output of the segmentation model may also be used as a secondary input to the preprocessing module (shown with a dotted arrow in FIG. 4(e)).

If the segmentation model is trainable, and segmentation data is available for training images, an additional segmentation loss function $\mathcal{L}_{seg}$ is used to train the segmentation model. The segmentation loss function operates on the predicted segmentation X and a ground truth image segmentation Y. An example embodiment of this loss is the Dice loss:

$$\mathcal{L}_{seg} = \frac{2|X \cap Y|}{|X| + |Y|}$$

where $|X \cap Y|$ denotes the intersection of the two images (i.e. the number of pixels for which both models predict the same segmentation) and $|X|$ and $|Y|$ are the number of pixels in each of the images.

In embodiments, the input to the preprocessing module is a video with both spatial and temporal components, rather than a single image. In this case, in some embodiments, the 2D convolutions (operating on the horizontal and vertical image dimensions) are replaced by 3D convolutions (operating on the horizontal and vertical image dimensions as well as the time dimension). Alternatively, 2D convolutions are used in conjunction with long short term memory (LSTM) modules to capture spatial and temporal dimensions separately.

Figure 5:
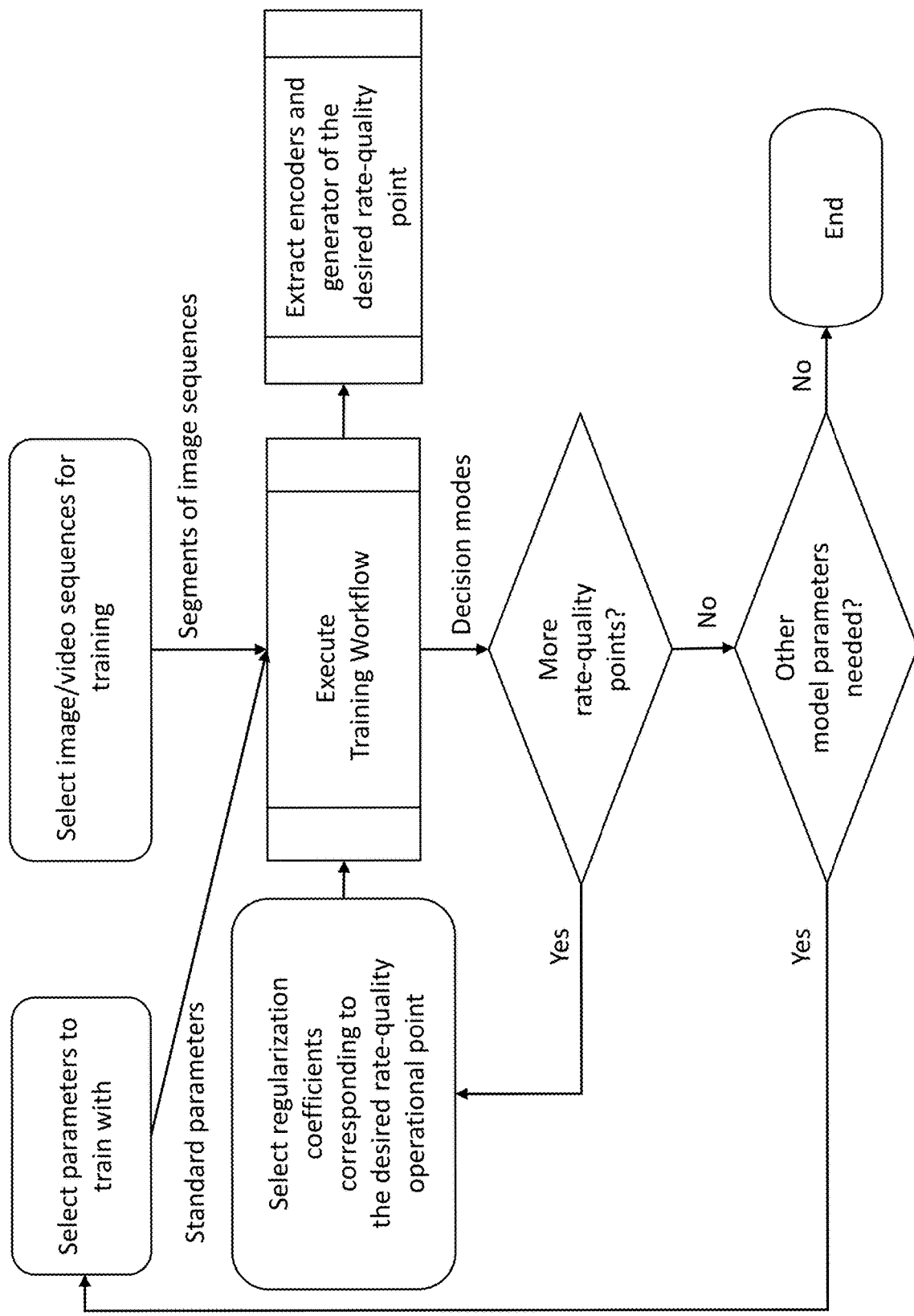
FIG. 5 is a schematic workflow diagram showing an example training process in accordance with embodiments.

FIG. 5 shows schematically a training process for the components, functions and encoders described herein. In FIG. 5, the 'training workflow' corresponds to the embodiments described previously for supervised or unsupervised training of the encoders and the image generator. The 'parameter to train with' in FIG. 5 refers to the selection of the specific training embodiment and its corresponding parameters from the training embodiments described previously. The 'rate' referred to in FIG. 5 is calculated based on the average number of bits after the compaction and quantization process is performed on training data (e.g. after processing the training data at the encoders). The 'quality' referred to in FIG. 5 corresponds to the average set of loss function values when the training has converged. Depending on the number of different rate-quality points desired, the example workflow of FIG. 5 shows that the number of training iterations can be adjusted, and multiple encoders and/or image generators can be produced, corresponding to the various desired rate-quality points.

Finally, at inference (i.e. deployment), a specific instantiation of the trained encoders and image generator is selected, and the overall inference schematic follows that of FIG. 1. During inference, new and previously unseen image and/or video data is processed by the trained encoders, which generate the compact representations (i.e. the first and second data structures) for storage or transmission to the image generator. The trained image generator then converts the compact representations into an output image that approximates (e.g. is structurally similar to) the input image.

For brevity, training and inference are described herein as two separate 'offline' and 'online' stages. However, it will be understood that training can also take place periodically or continuously during inference, e.g. based on new data from the domain-specific inference, and the encoders and/or image generator can be adjusted and/or new versions produced, based on such periodic or continuous training.

In embodiments, training data includes data from a specific application domain, e.g. industrial monitoring, video game streaming, video conferencing, etc. The application domain corresponds to the domain expected during deployment (i.e. inference) of the image processing system. As such, the training dataset includes representative elements of the structure of what is expected to appear in the actual scenes of the video at inference. This allows the structure of the reconstruction to be similar to the structure of the input image at inference.

Figure 6:
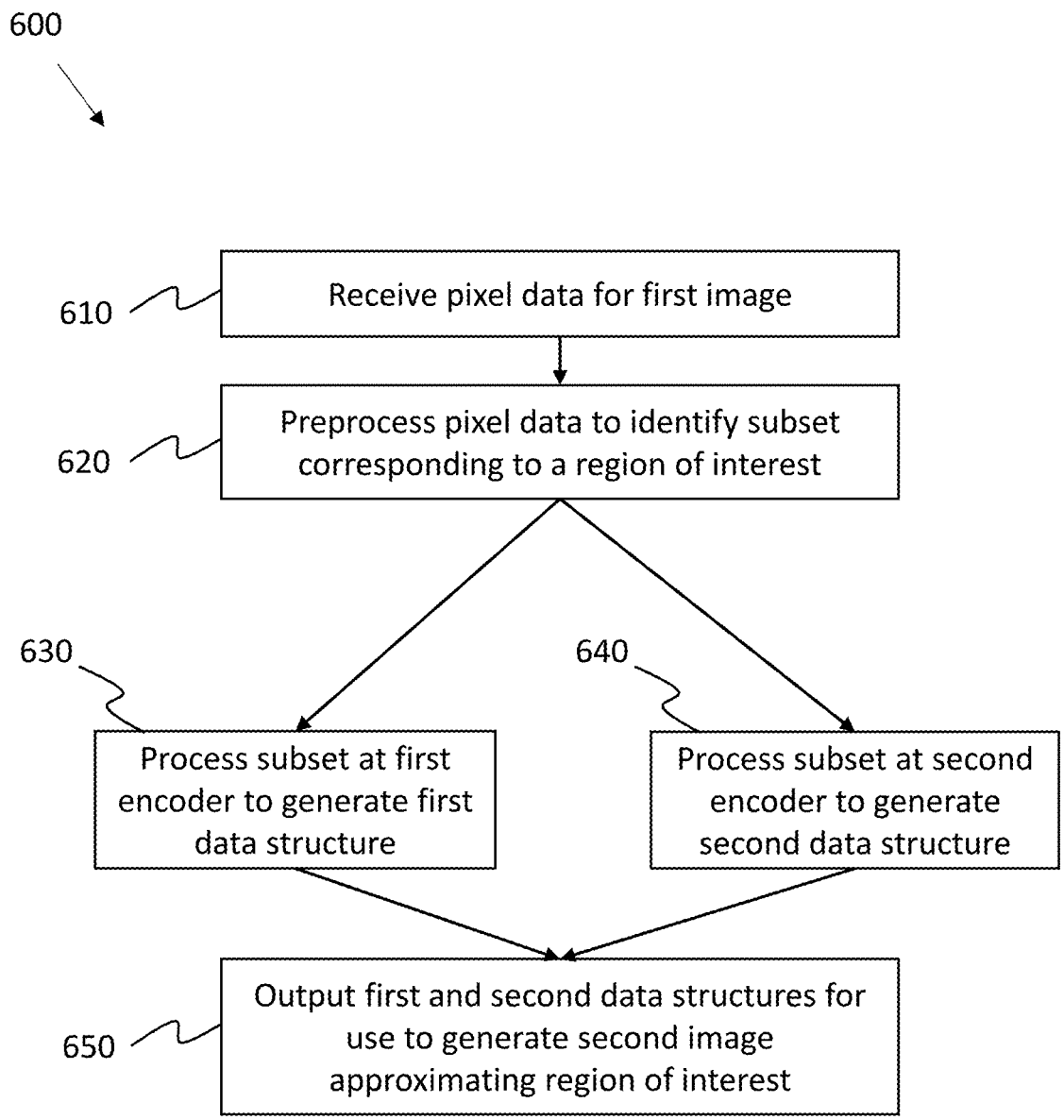
FIG. 6 is a flowchart showing the steps of a method of processing image data in accordance with embodiments.

FIG. 6 shows a method 600 for processing image data. The method 600 may be performed by a computing device, according to embodiments. The method 600 may be performed at least in part by hardware and/or software. In embodiments, the method 600 is performed at least in part by an encoder apparatus. Such an encoder apparatus may be operable to send data to one or more decoders, e.g. via a wireless network, and/or to store data in a storage medium.

At item 610, pixel data for a first image is received. The pixel data may be retrieved from storage (e.g. in a memory), or may be received from another entity (e.g. live camera feed).

At item 620, the pixel data is preprocessed to identify a subset of the pixel data corresponding to a region of interest of the first image. The region of interest depicts at least one scene element. In embodiments, the preprocessing comprises using an artificial neural network (e.g. by applying the weights of the artificial neural network to the pixel data) to generate output data indicative of the region of interest and/or the subset of the pixel data corresponding to the region of interest. Such an artificial neural network is trained to identify regions of interest from images, as described in more detail above.

At item 630, the subset of the pixel data is first processed at a first encoder to generate a first data structure. The first data structure is representative of the region of interest (i.e. of the content of the region of interest). The first data structure comprises a scene element identifier identifying the at least one scene element depicted in the region of interest. The scene element identifier is invariant to changes in the configuration of the at least one scene element between different images depicting the at least one scene element. For example, the scene element identifier may be invariant to changes in one or more visual characteristics associated with how the at least one scene element is depicted. In embodiments, the first data structure does not comprise pixel data. As such, the first data structure may comprise less data (i.e. be more compact) than the subset of pixel data.

At item 640, the subset of the pixel data is second processed at a second encoder to generate a second data structure. The second data structure is representative of the region of interest (i.e. of the content of the region of interest). The second data structure comprises values for one or more visual characteristics associated with the at least one scene element depicted in the region of interest. In embodiments, the second data structure does not comprise pixel data. As such, the second data structure may comprise less data (i.e. be more compact) that the subset of pixel data. In embodiments, the one or more visual characteristics are scene element-specific, e.g. different visual characteristics may be used for different scene elements and/or scene element types. The values for the one or more visual characteristics may complement the scene element identifier included in the first data structure. That is, the second data structure may comprise additional information not included in the first data structure.

At item 650, the first data structure and the second data structure are outputted for use by a decoder to generate a second image approximating the region of interest. In embodiments, the first data structure and the second data structure are outputted for transmission, e.g. via a network. In alternative embodiments, the first data structure and the second data structure are outputted for storage, e.g. in a memory or storage medium. In embodiments, the first data structure and the second data structure are fused into a single overall data structure representative of the content of the region of interest. Such an overall data structure (and/or the first and/or second data structures) may additionally be processed, quantized and/or compressed prior to transmission and/or storage using the fusion module.

In embodiments, the second image is a photorealistic rendering of the at least one scene element depicted in the region of interest of the first image. In embodiments, the second image resembles the region of interest of the first image, but is not an exact reconstruction or replica of the region of interest of the first image.

In embodiments, the second encoder is configured to determine the one or more visual characteristics whose values are to be included in the second data structure.

In embodiments, the second encoder is configured to determine the one or more visual characteristics by identifying features of the region of interest which are visually salient.

In embodiments, the first encoder comprises a convolutional neural network. The convolutional neural network may use a differentiable loss function. In embodiments, the differentiable loss function comprises a triplet loss function.

In embodiments, the first encoder is configured to distinguish between the at least one scene element that is depicted in the region of interest and at least one second scene element, the at least one scene element and the at least one second scene element being of a common scene element type.

In embodiments, the scene element identifier is indicative of generic structural characteristics of the content of the region of interest in comparison to other regions of the image and/or of other images. For example, this may be in contrast with the values of the one or more visual characteristics comprised in the second data structure, which may be indicative of more specific (or fine-grained) characteristics of the content of the region of interest.

In embodiments, the second encoder comprises a convolutional neural network configured to output a vector comprising the values of the one or more visual characteristics.

In embodiments, the second encoder is configured to determine visual details of the region of interest to which the subset of pixel data corresponds that are not captured by the first processing at the first encoder.

In embodiments, the second encoder is configured to locate one or more landmarks in the region of interest to which the subset of pixel data corresponds. The one or more visual characteristics comprise co-ordinates of the one or more landmarks in the region of interest.

In embodiments, the one or more visual characteristics relate to one or more of: lighting, contrast, orientation, movement, and perspective in the region of interest.

In embodiments, the method 600 comprises generating, using an image generator module, the second image using the scene element identifier and the values of the one or more visual characteristics.

In embodiments, the first encoder and/or the second encoder are trained using back-propagation of errors based on a comparison between the region of interest of the first image and the second image generated by the image generator module. Such training may be part of the method 600 or may occur prior to the method 600 being performed.

In embodiments, the first encoder and/or the second encoder are trained using a discriminator function configured to determine whether the second image generated by the image generator module is a real image or a synthesized image. The discriminator function is configured to produce a composite set of loss functions that can be minimized using stochastic gradient descent and backpropagation through the first encoder and/or the second encoder.

In embodiments, the set of loss functions are calculated in a latent space of a neural network that takes as inputs the subset of pixel data corresponding to the region of interest of the first image and the second image generated by the image generator module.

In embodiments, the first encoder and/or the second encoder are trained using one or more optimizing functions configured to score a loss of fidelity between the region of interest of the first image and the second image generated by the image generator module based on one or more of mean absolute error, mean squared error, and/or structural similarity index metrics that can be minimized using stochastic gradient descent and backpropagation through the first encoder and/or the second encoder.

In embodiments, the second image comprises a photorealistic rendering of the region of interest to which the subset of the pixel data corresponds.

Figure 7:
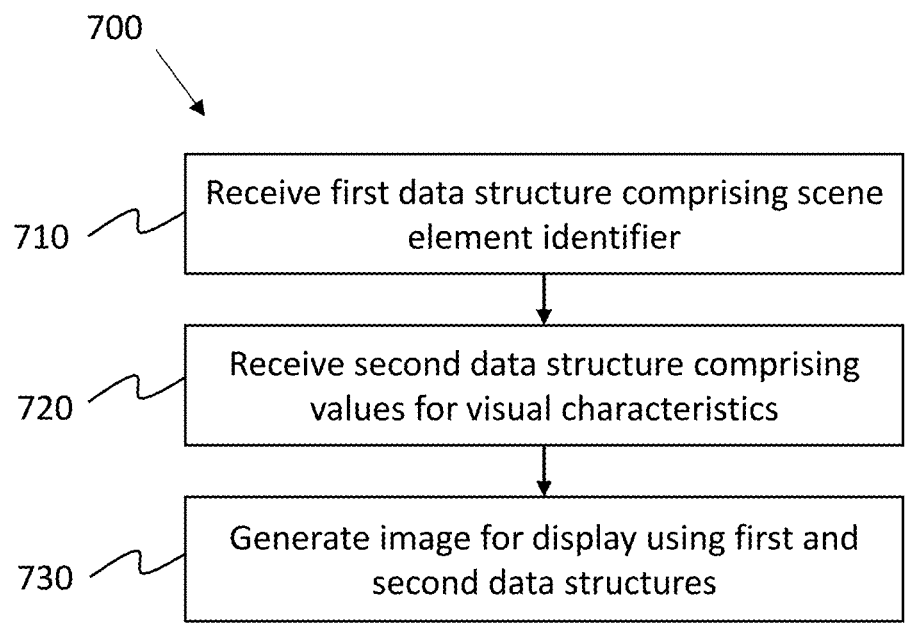
FIG. 7 is a flowchart showing the steps of generating an image in accordance with embodiments.

FIG. 7 shows a method 700 of generating an image. The method 700 may be performed by a computing device, according to embodiments. The method 700 may be performed at least in part by hardware and/or software. In embodiments, the method 700 is performed at least in part by a decoder. Such a decoder may be operable to receive data from one or more encoders, e.g. via a wireless network, and/or to retrieve data from a storage medium.

At item 710, a first data structure is received. The first data structure may be received from an encoder. The first data structure is representative of a region of interest of a first image (i.e. of the content of the region of interest). The first data structure comprises a scene element identifier identifying at least one scene element depicted in the region of interest (e.g. in a depicted scene). The scene element identifier is invariant to changes in the configuration of the at least one scene element between different images depicting the at least one scene element. For example, the scene element identifier may be invariant to changes in one or more visual characteristics associated with the depiction of the at least one scene element. In embodiments, the first data structure does not comprise pixel data.

At item 720, a second data structure is received. The second data structure may be received from an encoder (which may be the same as or different from the encoder from which the first data structure is received). The second data structure is representative of the region of interest of the first image. The second data structure comprises values for one or more visual characteristics associated with the at least one scene element depicted in the region of interest. The values for the one or more visual characteristics may complement the scene element identifier included in the first data structure. That is, the second data structure may comprise additional information not included in the first data structure, which may be used to generate a new image resembling (or approximating) all or part of the first image, by using the values of the visual characteristics associated with the depiction of the at least one scene element in the first image. In embodiments, the second data structure does not comprise pixel data.

At item 730, a second image is generated for display using the first data structure and the second data structure. The second image approximates the region of interest of the first image. In embodiments, the second image is a photorealistic rendering of the at least one scene element depicted in the region of interest of the first image. In embodiments, the second image resembles the region of interest of the first image, but is not an exact reconstruction or replica of the region of interest of the first image. For example, the generated second image may resemble the structure and scene elements present in the region of interest of the first image, but not their exact visual appearance. In addition to the image, item 730 can also output a segmentation map in pixel space designating the pixel locations to which the rendered at least one scene element corresponds. The segmentation map can be used to fill in pixels that are not occupied by scene elements with a background image. This background image can be either derived from the input background or be independent of the input, for example provided as a separate input to the generator.

The generated second image may be displayed on a display device. The display device may be separate from the device performing the method 700 (e.g. the decoder), or may include the device performing the method 700. Examples of such display devices include, but are not limited to, monitors, mobile devices, televisions, personal computers, laptop computers, tablet computers, etc.

Figure 8:
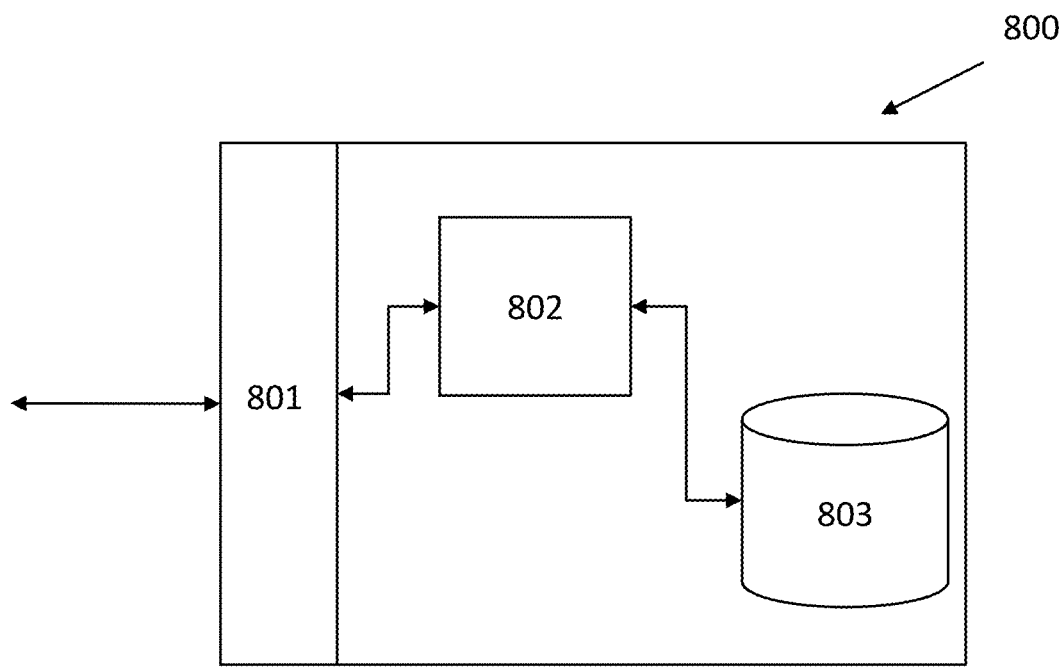
FIG. 8 is a schematic diagram of a computing device in accordance with embodiments.

Embodiments of the disclosure include the methods described above performed on a computing device, such as the computing device 800 shown in FIG. 8. The computing device 800 comprises a data interface 801, through which data can be sent or received, for example over a network. The computing device 800 further comprises a processor 802 in communication with the data interface 801, and memory 803 in communication with the processor 802. In this way, the computing device 800 can receive data, such as image data, video data, or various data structures, via the data interface 801, and the processor 802 can store the received data in the memory 803, and process it so as to perform the methods of described herein, including processing image data and/or generating images.

Each device, module, component, machine or function as described in relation to any of the examples described herein may comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The present disclosure also provides a system for domain-specific compact representation of image or video data, comprising: a scene preprocessing component configured to select one or more areas of interest of an input image or video data; for each of the areas of interest: (i) a structure extraction encoder configured to extract all scene-specific details from the input area and represent them in a compact format; (ii) a scene identity encoder configured to obtain a compact scene descriptor for the input area that represents the generic attributes of the type of scene; and a scene generator component, which receives the outputs of the structure extraction and scene identity encoders, wherein the scene generator component is configured to synthesize a photorealistic rendering of the areas of interest resembling the structure and scene elements present in the input areas of interest, but not their exact visual appearance.

In embodiments, the structure extraction encoder component is a convolutional neural network, which ingests the input area of interest and outputs a vector that represents in a compact manner the visually salient features of the input area of interest.

In embodiments, the scene identity encoder is a neural network that ingests the input area of interest and outputs a compact identifier representing the area's generic structural characteristics in comparison to other areas of any input image or video that has been passed through the system.

In embodiments, the scene generator component is a convolutional neural network that uses as input: (i) the compact identifier output from the scene identity encoder; and (ii) the compact representation output from the structure extraction encoder.

In embodiments, the training parts of the system are optimizing functions that score the loss of fidelity between the scene generator output and the input image or video frames based on variations of mean absolute error or mean squared error or structural similarity index metrics that can be minimized using stochastic gradient descent and backpropagation through the scene generator and encoding components. Furthermore, the training parts can include non-differentiable (e.g. integer valued) optimizing functions that pertain to other aspects of the model. For instance, in architecture search the number and size of neural network layers can be part of the optimization. The respective loss function involves a complexity term that represents the computational burden the specific architecture imposes. Such functions are minimized using gradient free optimization approaches.

In embodiments, the training parts include the output of the scene generator component and the output of a discriminator component, which distinguishes if the scene generator output is a real input image or a generated input image, into a composite set of loss functions that can be minimized using stochastic gradient descent and backpropagation through the scene generator, encoding and discriminator components.

In embodiments, the loss functions used herein are calculated in the latent space of a neural network that takes as input the input image or video and the corresponding generated image or video.

In embodiments, the training and/or inference neural network architectures used herein include regularization methods based on spectral renormalization.

In embodiments, the training is repeated during inference with new real data and updates for the encoders and scene generator component can be derived to be used during inference.

The systems and methods described herein achieve domain-specific compact video representations with application in: video communications, video streaming, video monitoring in autonomous vehicle or surveillance, industrial or Internet-of-Things (IoT) visual monitoring, etc. The system consists of two subsets, a training part and an inference part. For the training part, the system ingests representative segments of video (i.e. training data) that include visual representations of all scene elements expected to appear in the specific domain of application. For example, for a traffic monitoring system, this comprises several scenes of cars passing through the monitored traffic junction(s) under all typical junction traffic conditions. For a video game streaming service, this includes several video segments that include all visual scenes of the video game. For an industrial or IoT monitoring context, this would include visual captures under all operational conditions expected for the monitored system. The training part of the system then produces three subsystems: (i) a structure extraction encoder configured to extract all scene-specific details from the input areas in the video frames and provide compact representations for them; (ii) a scene identity encoder configured to obtain a compact scene descriptor for each input area; and (iii) a generator component. The generator can be trained offline based on offline training outputs of the two encoders and adjusted such that it generates video frames that visually resemble the training input video frame data. Alternatively, the generator can be trained online using one-shot or few-shot learning. In the latter case, a pretrained model is adaptively adjusted on-the-fly via the transfer a single or multiple pixel images.

The inference part of the system has two components: the encoder and the decoder. The encoder component processes input video from the specific domain using the first two pretrained components from the training system (structure extraction and scene identity encoders) and produces a very compact representation of each input video frame via the pretrained first two components. The decoder component of the inference part comprises the pretrained image generator, which ingests the output of the inference encoder and generates a rendered representation that visually resembles the input. The rendered representation is designed to be photorealistic for the specific application domain, but is produced based on image patches from the training domain, not from the inference input; the image generator only uses the structure of the input and an identity identifier to synthesize its output to resemble the structure of the input, but not its exact visual appearance. The system components can be constructed with neural networks in order to make them learnable based on input training data from each specific domain (e.g., surveillance, industrial or 'Internet of Things' monitoring, video gaming, conversational service, etc.) by using stochastic gradient descent during the training phase and a set of trained neural networks at inference.

While the present disclosure has been described and illustrated with reference to particular embodiments, it will be appreciated by those of ordinary skill in the art that the disclosure lends itself to many different variations not specifically illustrated herein.

In embodiments described above, the image processing system receives pixel data for an image. In alternative embodiments, the system receives pixel data for a video comprising multiple images.

In embodiments described above, the pixel data is preprocessed by a preprocessing function to identify a subset of the pixel data before passing such to the first and second encoders. In alternative embodiments, no such preprocessing is performed. That is, the first and second encoders may receive the pixel data for the entire image, rather than for a selected region of interest.

In embodiments described above, the first and second encoders comprise separate neural networks. In alternative embodiments, the first and second encoders correspond to a single neural network having the functionalities of both encoders.

In embodiments described above, the first and second encoders comprise neural networks such as CNNs. In alternative embodiments, one or both of the first and second encoders does not comprise a neural network. Similarly, in some embodiments, the preprocessing function and/or the image generator function do not comprise neural networks. Such functions and/or encoders may comprise hard-coded algorithms, for example.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

What is claimed is:

1. A computer-implemented method of processing image data, the method comprising:
receiving pixel data of a first image;
preprocessing the received pixel data to identify a subset of the pixel data of the first image, the subset of the pixel data corresponding to a region of interest of the first image depicting at least one scene element;
first processing the subset of the pixel data of the first image at a first encoder to generate a first data structure representative of the region of interest of the first image, the first data structure comprising a scene element identifier identifying the at least one scene element depicted in the region of interest of the first image, wherein the scene element identifier is invariant to changes in a configuration of the at least one scene element between different images depicting the at least one scene element;
second processing the subset of the pixel data of the first image at a second encoder to generate a second data structure representative of the region of interest of the first image, the second data structure comprising values for one or more visual characteristics associated with the at least one scene element depicted in the region of interest of the first image; and outputting the first data structure and the second data structure for use by a decoder to generate a second image approximating the region of interest of the first image,
wherein the one or more visual characteristics, the values of which are to be included in the second data structure, are determined by the second encoder based on the identity of the at least one scene element as determined by the first encoder.

2. The computer-implemented method of claim 1 wherein the second encoder is configured to determine the one or more visual characteristics by identifying features of the region of interest which are visually salient.

3. The computer-implemented method of claim 1, wherein the first encoder comprises a convolutional neural network that uses a differentiable loss function.

4. The computer-implemented method of claim 3, wherein the differentiable loss function comprises a triplet loss function.

5. The computer-implemented method of claim 1, wherein the first encoder is configured to distinguish between the at least one scene element that is depicted in the region of interest and at least one second scene element, the at least one scene element and the at least one second scene element being of a common scene element type.

6. The computer-implemented method of claim 1, wherein the scene element identifier is indicative of generic structural characteristics of content of the region of interest in comparison to other regions of the image and/or other images.

7. The computer-implemented method of claim 1, wherein the second encoder comprises a convolutional neural network configured to output a vector comprising the values of the one or more visual characteristics.

8. The computer-implemented method of claim 1, wherein the second encoder is configured to determine visual details of the region of interest to which the subset of the pixel data corresponds that are not captured by the first processing at the first encoder.

9. The computer-implemented method of claim 1, wherein the second encoder is configured to locate one or more landmarks in the region of interest to which the subset of the pixel data corresponds, wherein the one or more visual characteristics comprise coordinates of the one or more landmarks in the region of interest.

10. The computer-implemented method of claim 1, wherein the one or more visual characteristics relate to one or more of: lighting, orientation, movement, and perspective in the region of interest.

11. The computer-implemented method of claim 1, comprising generating, using an image generator module, the second image using the scene element identifier and the values of the one or more visual characteristics.

12. The computer-implemented method of claim 11, wherein the first encoder and/or the second encoder are trained using back-propagation of errors based on a comparison between the region of interest of the first image and the second image generated by the image generator module.

13. The computer-implemented method of claim 11, wherein the first encoder and/or the second encoder are trained using a discriminator function configured to determine whether the second image generated by the image generator module is a real image or a synthesized image, the discriminator function being configured to produce a composite set of loss functions that can be minimized using stochastic gradient descent and backpropagation through the first encoder and/or the second encoder.

14. The computer-implemented method of claim 13, wherein the composite set of loss functions are calculated in a latent space of a neural network that takes as inputs the subset of the pixel data corresponding to the region of interest of the first image and the second image generated by the image generator module.

15. The computer-implemented method of claim 11, wherein the first encoder and/or the second encoder are trained using one or more optimizing functions configured to score a loss of fidelity between the region of interest of the first image and the second image generated by the image generator module based on one or more of mean absolute error, mean squared error, and/or structural similarity index metrics that can be minimized using stochastic gradient descent and backpropagation through the first encoder and/or the second encoder.

16. The computer-implemented method of claim 1, wherein the second image comprises a photorealistic rendering of the region of interest to which the subset of the pixel data corresponds.

17. A computer-implemented method of generating an image at a decoder, the method comprising:
receiving a first data structure representative of a region of interest of a first image, the first data structure generated by a first encoder and comprising a scene element identifier identifying at least one scene element depicted in the region of interest of the first image, wherein the scene element identifier is invariant to changes in a configuration of the at least one scene element between different images depicting the at least one scene element;
receiving a second data structure representative of the region of interest of the first image, the second data structure comprising values for one or more visual characteristics associated with the at least one scene element depicted in the region of interest of the first image; and
generating for display, using the first data structure and the second data structure, a second image approximating the region of interest of the first image,
wherein the one or more visual characteristics, the values of which are to be included in the second data structure, are determined by a second encoder based on the identity of the at least one scene element.

18. A computing device comprising:
a processor; and
a memory,
wherein the computing device is arranged to perform, using the processor, a method of processing image data, the method comprising:
receiving pixel data of a first image;
preprocessing the received pixel data to identify a subset of the pixel data corresponding to a region of interest of the first image depicting at least one scene element;
first processing the subset of the pixel data of the first image at a first encoder to generate a first data structure representative of the region of interest of the first image, the first data structure comprising a scene element identifier identifying the at least one scene element depicted in the region of interest of the first image, wherein the scene element identifier is invariant to changes in a configuration of the at least one scene element between different images depicting the at least one scene element;
second processing the subset of the pixel data of the first image at a second encoder to generate a second data structure representative of the region of interest of the first image, the second data structure comprising values for one or more visual characteristics associated with the at least one scene element depicted in the region of interest of the first image; and outputting the first data structure and the second data structure for use by a decoder to generate a second image approximating the region of interest of the first image, wherein the one or more visual characteristics, the values of which are to be included in the second data structure, are determined by the second encoder based on the identity of the at least one scene element as determined by the first encoder.

19. A non-transitory computer-readable medium comprising computer-executable instructions that, when executed by a processor of a computing device, cause the computing device to perform a method of processing image data, the method comprising:

receiving pixel data of a first image;

preprocessing the received pixel data to identify a subset of the pixel data of the first image, the subset of pixel data corresponding to a region of interest of the first image depicting at least one scene element;

first processing the subset of the pixel data of the first image at a first encoder to generate a first data structure representative of the region of interest of the first image, the first data structure comprising a scene element identifier identifying the at least one scene element depicted in the region of interest of the first image, wherein the scene element identifier is invariant to changes in a configuration of the at least one scene element between different images depicting the at least one scene element;

second processing the subset of the pixel data of the first image at a second encoder to generate a second data structure representative of the region of interest of the first image, the second data structure comprising values for one or more visual characteristics associated with the at least one scene element depicted in the region of interest; and outputting the first data structure and the second data structure for use by a decoder to generate a second image approximating the region of interest of the first image, wherein the one or more visual characteristics, the values of which are to be included in the second data structure, are determined by the second encoder based on the identity of the at least one scene element as determined by the first encoder.

* * * * *